United States Patent [19]

Stalsberg et al.

[11] Patent Number: 5,460,221

[45] Date of Patent: Oct. 24, 1995

[54] FAN COIL THERMOSTAT WITH CIRCUITRY TO ASSURE MINIMUM POWER FOR RELAY PULL-IN

[75] Inventors: Kevin J. Stalsberg, Ramsey; James E. Ingalls, Anoka County, both of Minn.

[73] Assignee: Honeywell Inc., Minneapolis, Minn.

[21] Appl. No.: 304,023

[22] Filed: Sep. 9, 1994

Related U.S. Application Data

[62] Division of Ser. No. 28,495, Mar. 9, 1993.

[51] Int. Cl.⁶ .................................................. F25B 29/00
[52] U.S. Cl. .................. 165/25; 165/26; 165/50; 165/57; 236/1 C; 236/37; 236/38
[58] Field of Search .................. 165/25, 26, 50; 236/1 C, 37, 38; 62/160

[56] References Cited

U.S. PATENT DOCUMENTS 5,304,781  4/1994  Stalsberg .................. 219/501

Primary Examiner—John K. Ford
Attorney, Agent, or Firm—John G. Shudy, Jr.

[57] ABSTRACT

A thermostat capable of accommodating primary and secondary loads is taught. Preferably a hydronic valve actuator is the primary load and a fan coil of variable speed is the secondary load. Temperature sensing is electronic and both heating and cooling as well as multiple fan modes are accommodated.

1 Claim, 5 Drawing Sheets (FROM Fig.4A)

FAN COIL THERMOSTAT WITH CIRCUITRY TO ASSURE MINIMUM POWER FOR RELAY PULL-IN

This application is a division of application Ser. No. 08/028,495, filed Mar. 9, 1993.

This invention relates to a fan coil thermostat and more particularly, to thermostats which drive hydronic valves and single or multispeed fans. In general, this invention also can be used to drive electric baseboard type heaters which employ fan coil or similar controls as an adjunct to the heating element or other systems with multiactuator and mode control features.

BACKGROUND OF THE INVENTION

In bringing thermostat control into the latest phase of its development, previous designs employing bimetal plates flexing due to temperature variation to actuate on/off switches have become undesirable means of regulating temperature. Accordingly, this patent describes a relatively inexpensive, purely electronic sensing and control thermostat capable of mode control and multiple (at least two) actuator control outputs, including the possibility of more than simple on/off control. Several features of the thermostat, including extending the range of application of the device, reducing power losses and internal device heating, and protecting the electronics are described herein.

Prior U.S. Pat. No. 4,776,514, shows a thermostat for electric baseboard heating without a fan coil control of a type which would ordinarily be installed, for example, in a domestic house. That thermostat has two terminals—one of which is connected to one side of the line voltage, and the other connected to a heater load, which is then connected to the other side of the line voltage. The thermostat itself contains a switch which must control large amounts of power in addition to some the of circuitry which enables the thermostat itself to be energized from the same line voltage source.

SUMMARY OF THE INVENTION

The thermostat described herein, using electronic temperature sensing, has a power switch using a ganged relay/triac (the triac is connected across the relay to provide a snubbing action for the relay contacts during their transition), power-up protection, and controls more than one actuator. In the preferred embodiment, one actuator is a hydronic valve control and the second is a fan coil control. The speed of the fan can be controlled using this thermostat as well as the mode of operation selected.

In the presently most preferred embodiment, hydronic valve control is used to adjust the flow of hot or cold fluid (most commonly water) which is used as the primary heating or cooling source. Energization of the fan coil to drive the fan, and control of its speed, is used as the secondary means for distributing the heating/cooling by convective air flow over the hot/cold water containing structures. The fan can be in continuous or noncontinuous operation mode, depending on jumper connections in the currently preferred embodiment. In the preferred embodiment for noncontinuous (cycling) operation mode, the fan turns on only at those times when heating or cooling is required. The speed of the fan is controlled by the fan speed switch where off-position results in low speed. For continuous operation mode, the fan will continuously operate at the selected speed and, if fan-off is selected, the fan will automatically turn on to low speed at those times when heating or cooling is required by the thermostat.

DETAILED DESCRIPTION OF THE INVENTION

Figure 1:
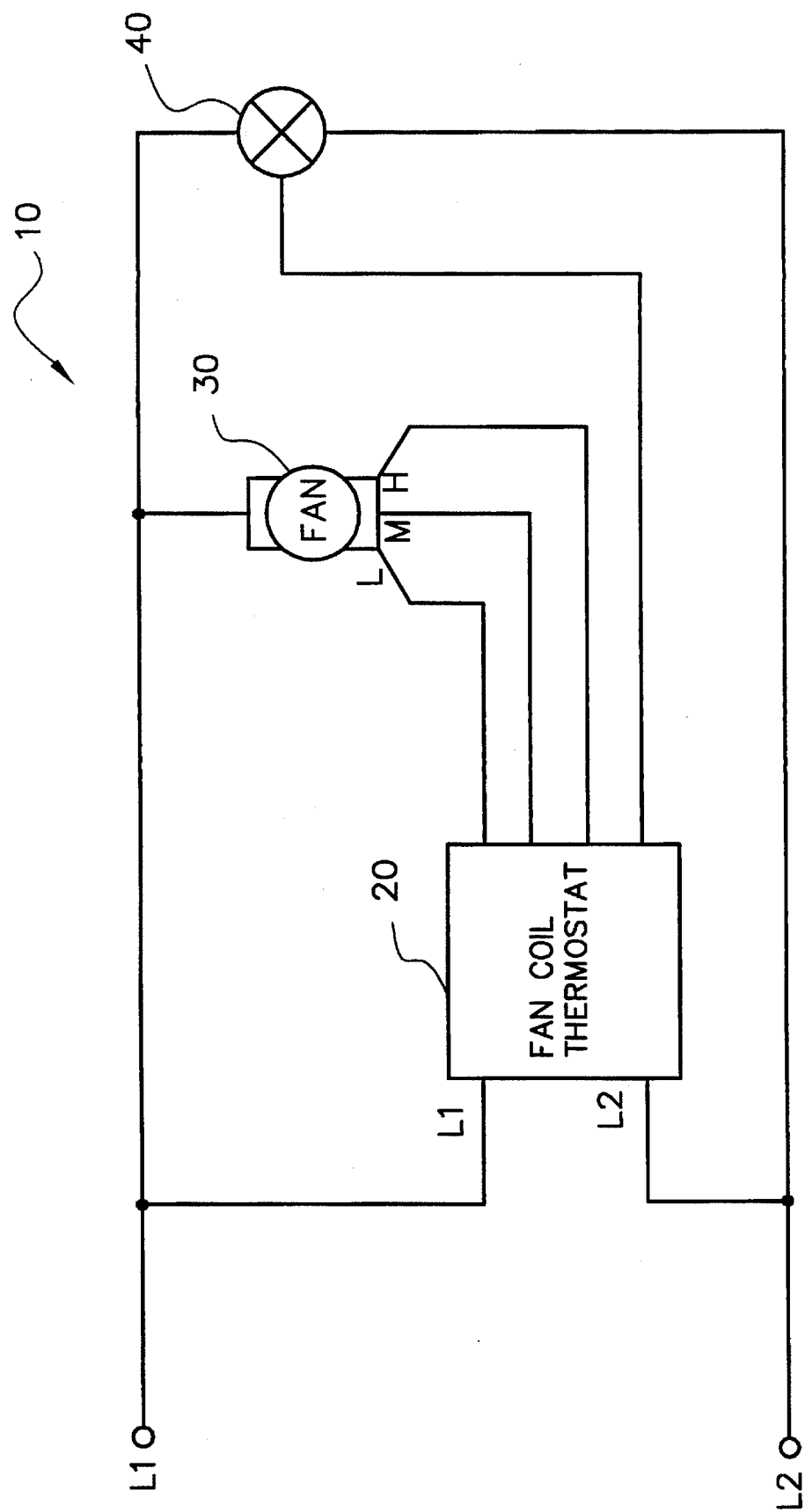
FIG. 1 is a block diagram of the preferred embodiment fan coil thermostat showing its association with, and connection to, input line voltage, hydronic valves, and fan controls.

In FIG. 1, the fan coil thermostat 20 is shown connected into the system 10 having line voltages inputs L1 and L2 and producing outputs low, medium and high, and valve controls (on/off) to the fan 30 and the hydronic valve 40.

Figure 4A:
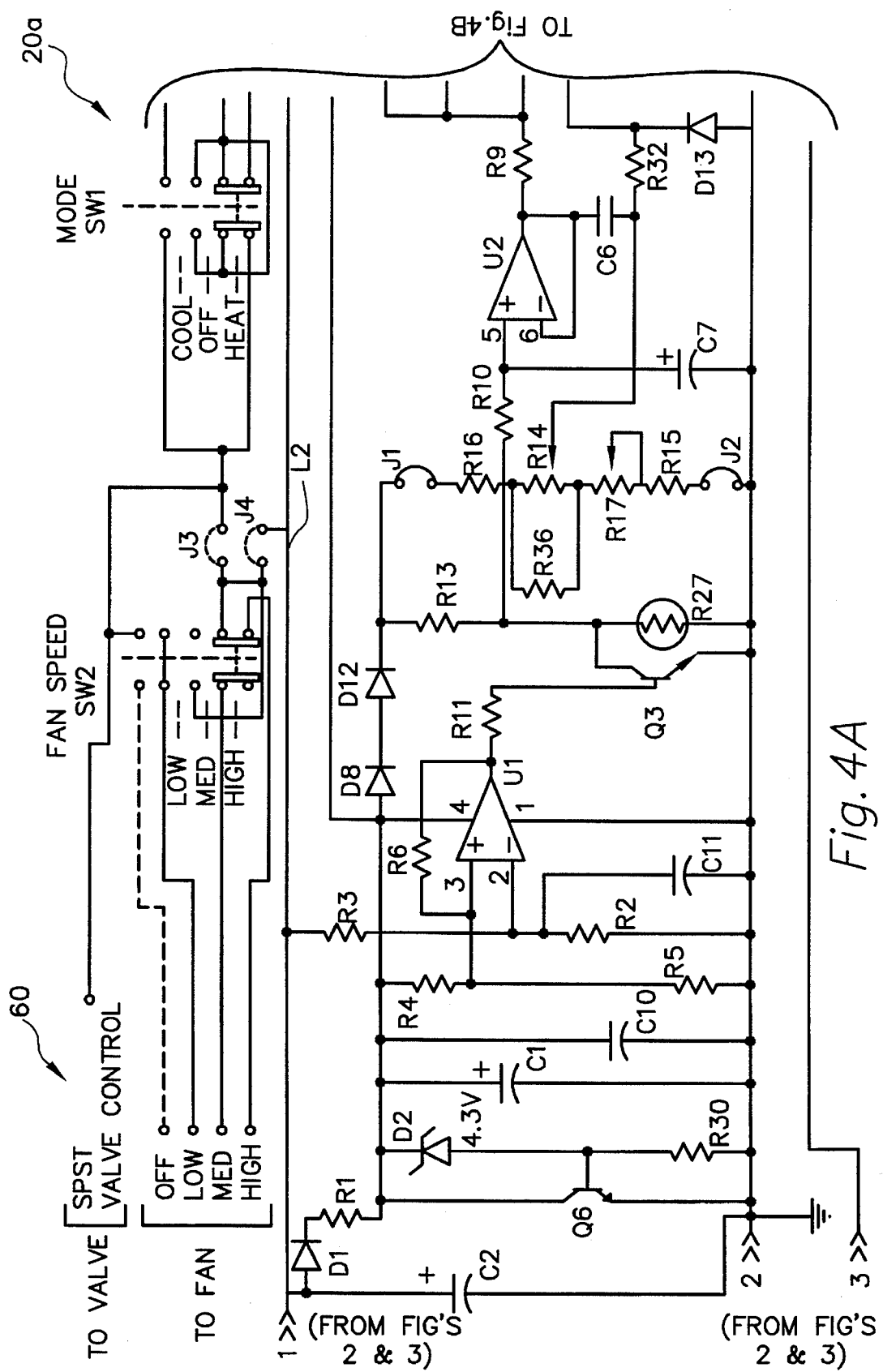
Figure 4B:
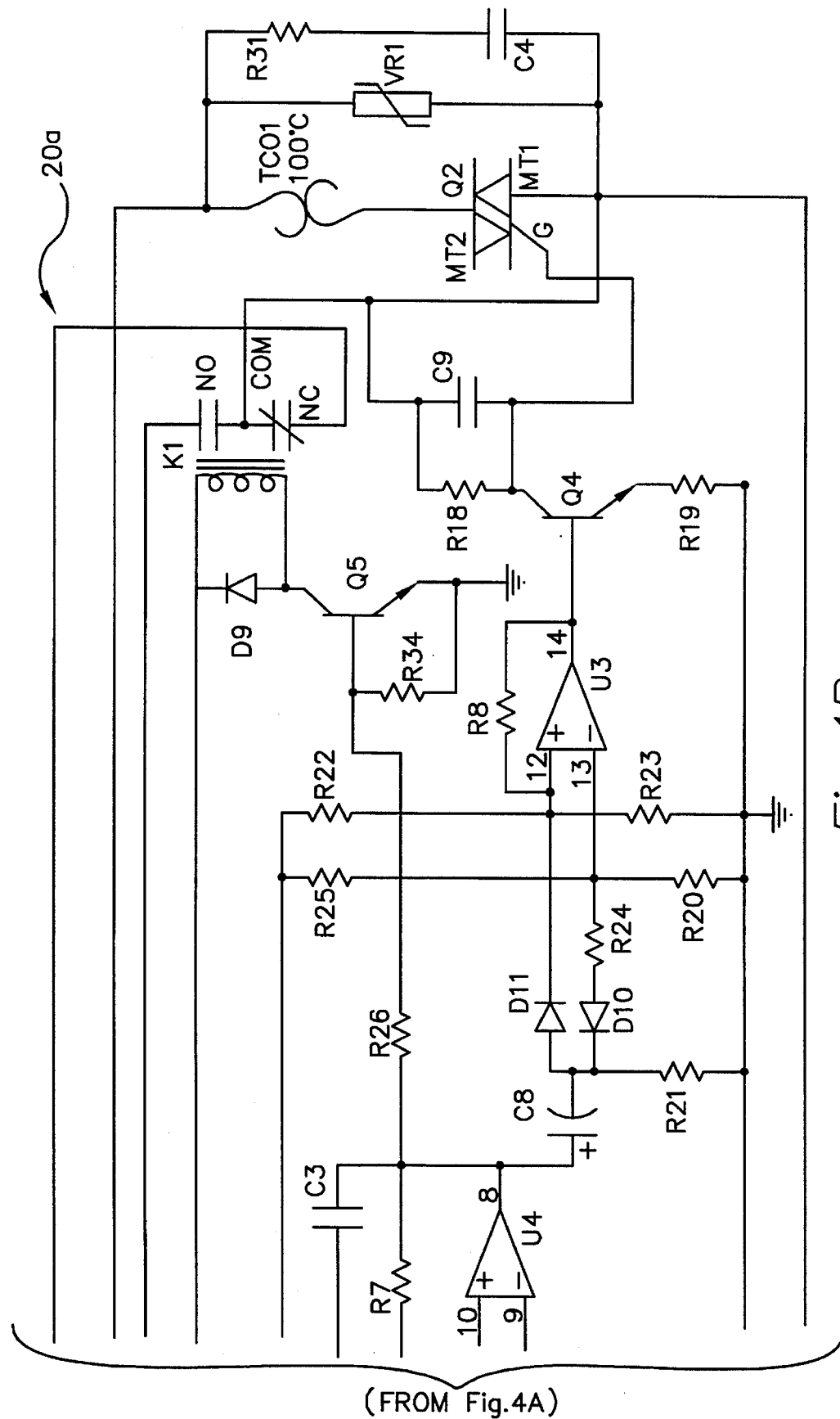
Figure 5:
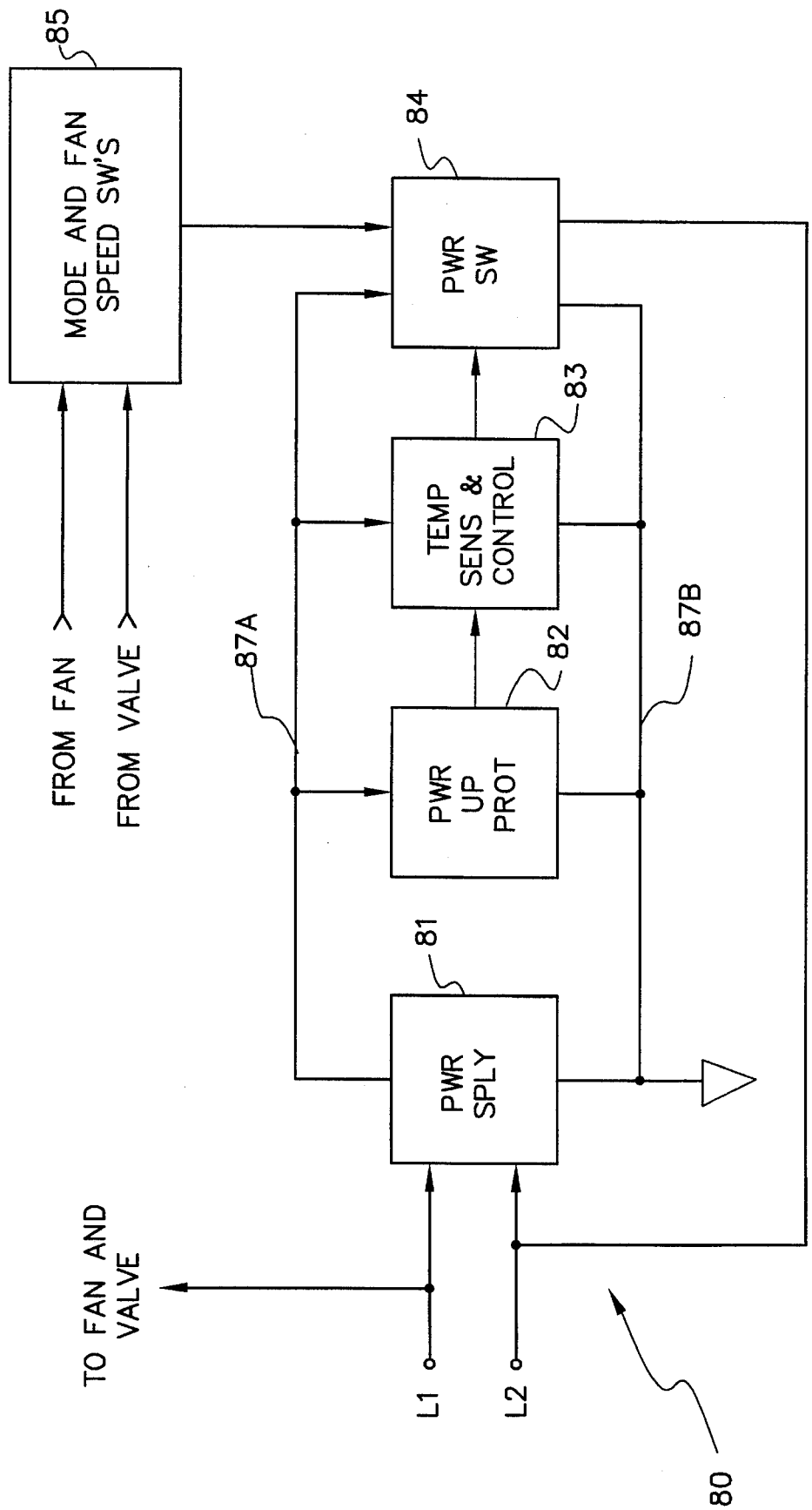
FIG. 5 is a heuristic block diagram showing the conceptual elements of the preferred embodiment fan coil thermostat described herein.

Referring now to FIG. 5, the system 80 is described in conceptual block diagram form comprising primarily five function blocks of circuitry: the power supply 81, the power up protection block 82, the temperature sense and control block 83, the power switch block 84, and the mode and fan speed control switches block 85. Described in this way, these function blocks provide convenient separations for describing the detailed design. However, it should be understood that these blocks are very closely interrelated and interconnected. Description of them in detail is described with reference to FIGS. 2, 3 and FIGS. 4A and 4B, as follows.

Power Supply

Figure 2:
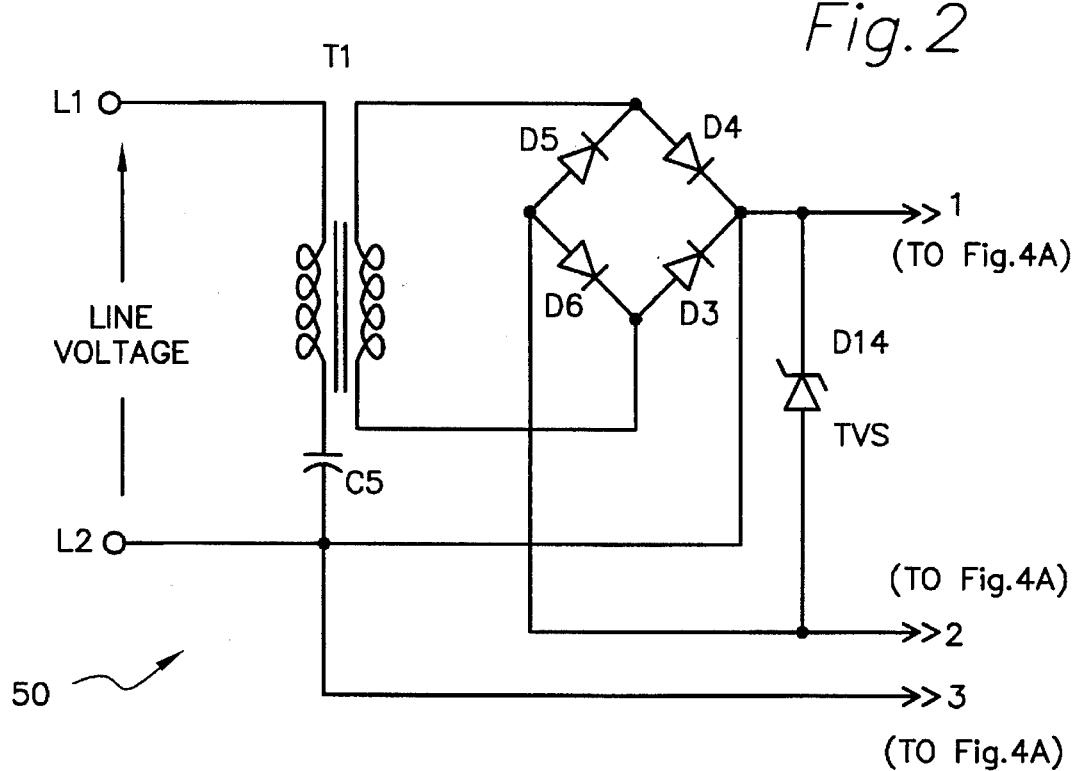
FIG. 2 and FIG. 3 are schematic diagrams of alternate power supplies used for connection to the schematic diagram of the thermostat control and switch control of FIGS. 4A and 4B.
Figure 3:
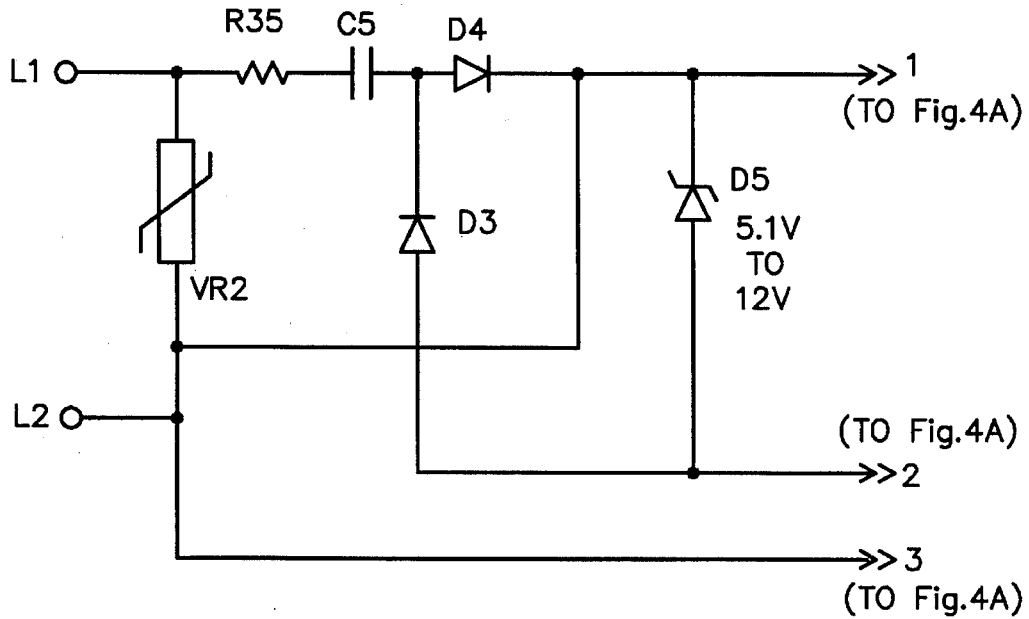

FIGS. 2 and 3 provide alternate power source descriptions. Although other power sources could be used for this invention, these two are preferred. It is desired that the power supply consist of four functions: 1) a voltage step-down; 2) AC rectification and filtering; 3) voltage regulation; and 4) transient protection. Important considerations in designing these power supplies is to keep power losses (primarily through internal heating) as low as possible and to accommodate a line voltage variation of plus or minus 10 to 15 percent. These considerations make it well suited to use in ordinary residential dwelling situations.

With reference to FIG. 2, the voltage step-down circuit components include transformer T1 and blocking capacitor C5, or resistor R35 and capacitor C5 in the alternative power supply described with reference to FIG. 3 (40).

Preferably, transformer T1 is a straight forward voltage transformer and capacitor C5 is utilized to reduce required primary turns (reduce the size of T1). In power supply 40, C5 and R35 provide the required impedance to drop voltage levels down and to limit current.

The step-down voltage becomes a DC voltage via rectification and regulation. This DC voltage must be adequate to provide for pull-in (of the contacts) of a relay K1 in FIG. 4B. At the same time, it must not become too large to damage the relay coil.

In expected applications of this invention no less than 70%, nor greater than 130%, of the rated relay coil voltage may be acceptable. The actual limits should be further restricted due to power dissipation on the regulation circuit components and due to required capacitive reserve; for a 12 volt relay coil used in one embodiment, the voltage across C2 must nominally satisfy the requirements of being between 9.6 Volts DC and 14.5 Volts DC, given a +10% to −15% variation in the line voltage input. It is certainly preferable that lower relay coil voltages be used (5 Volts, 6 Volts or 9 Volts) to reduce power losses and regulation. Some redesign from the presently preferred embodiment may be required for these lower voltages to be used. In the FIG. 2 version of the power supply 50, the step-down voltage is full-wave rectified by diodes D3, D4, D5 and D6 (in the presently preferred embodiment diodes are 1N 4004 diodes). The rectified voltage is regulated to the level required by the relay coil via the loads R1 and Q6 of FIG. 4A. In the power supply 40, the step-down voltage is half-wave rectified by diodes D3 and D4 (also 1N 4004's in the presently preferred embodiment) and regulated to the relay coil voltage by Zener diode D5. The output of the rectifier is filtered by capacitor C2 (in the presently preferred embodiment a 470 uF(25 V)) capacitor. This capacitor C2 was selected to provide sufficient rate of discharge to guarantee relay pull-in and triac pulse turn-on. This regulated voltage level (provided on line i of circuit 40 or 50) provides the K1 relay coil (FIG. 4B) and the Q2 triac gate drive. In order to directly drive the triac gate without isolation, this regulated DC voltage level must be directly referenced back to the line voltage circuit at the MT1 triac terminal connection point. (Further details of the triac gate drive are disclosed in the temperature sense and control function block description below). The voltage across capacitor C2 is further regulated to between 3.5 Volts DC and 4.0 Volts DC via component diodes D1 and D2, resistors R1 and R30, transistor Q6, capacitor C1 and capacitor C10 as shown connected in FIG. 4A. Components C1 and C10 provide low and high pass frequency filtering, respectively. Diode D1 prevents back-discharge of capacitor C1. Resistor R1 is a voltage-drop resistor. Zener diode D2, resistor R30 and transistor Q6 provide the regulated voltage level. This lower regulated voltage is the supply to the electronics for power up protection and temperature sense and control.

As part of the power supply, transient protection is also provided by this preferred embodiment circuit. A metal oxide varistor VR1 (in FIG. 4B) and a transient voltage suppressor D14 (in FIG. 2) provides one set of protection when using the FIG. 2 power supply 50. VR2, also a metal oxide varistor, seen in FIG. 3 power supply 40, provides circuit protection. The VR1 element mainly protects the Q2 triac from high rate current transients and from voltage levels in excess of the triac breakover voltage. Elements D14 in the one case, or VR2 in the other, protect most of the rest of the circuitry.

Power-Up Protection

Power-up protection includes a positive feedback compare function used to inhibit or enable the temperature sense electronics when the limits of its hysterisis band are crossed. This provides for stable and acceptable usage in a thermostat.

The high level regulated voltage (on line L2) from the power supply is divided down by resistors R3 and R2, is filtered by capacitor C11, and is compared through an op amp U1 to resistive division (between R4 and R5) of the low level regulated voltage.

This resistive division and positive feedback through the resistor R6 provide a power-up hysteresis band. For a 12 volt relay coil, the hysteresis voltages are tripped-in >=9.6 Volts DC (nominal) and temperature sensing enabled; trip-out $V_{C2}$ is <=8.8 Volts DC (nominal), temperature sensing disabled.

The hysterisis band is used to try to ensure that the temperature sense and control function block will not attempt to energize the relay coil without sufficient voltage available for pulling in the relay contacts. This prevents the possibility of the relay action lagging the control and triac snub action due to slow build-up of the supply voltage.

Temperature Sense and Control

Temperature sense and control consists of five functions. Relative temperature sensing (actual vs. setpoint), low pass filtering of relative temperature input, hysterisis comparison for on/off control, K1 relay coil drive control, and triac (Q2) gate pulse drive.

The diode D8 and D12 are used to drop the supply voltage of the temperature sensing circuitry approximately 1 Volt DC from the regulated supply voltage of 3.5 to 4 Volts DC, of the operational amplifiers U1–U4. This allows the limited op amp output voltage range to fully represent possible input voltages. That is, op amp outputs will not be clipped when the largest expected temperature sensing input voltage appears at its input. This is especially important in the operation of voltage follower amplifier U2.

The temperature sense function is accomplished using a bridge circuit, half of it providing a voltage representative of temperature-setpoint (resistors R14, 15, 16, 17, and 36); the other half providing a voltage representing the sensed temperature (R27 and R13). Regarding the setpoint half of the bridge, first note that the setpoint voltage comes from the center tap of the setpoint potentiometer R14. In this configuration where the upper leg and the lower leg of the bridge half share relative portions of potentiometer R14, the relation between the shaft position (in the preferred embodiment) of the potentiometer R14 and the setpoint voltage measured from the center leg of R14 is linearized. This results in equally spaced graduations with constant increments in temperature setpoint change. Given that R14 in the preferred embodiment has a 10% tolerance, acceptable setpoint errors are achieved over an accuracy range of 59–77 degrees Fahrenheit (F.), with a setpoint error of ±0.5 degrees F. and an operational range of from 41 to 95 degrees F., with a setpoint error of ±1.0 degree F. on the thermostat.

Resistors R15, R16, and R36 establish the setpoint knob rotation angle associated with the operational temperature range. Secondly, the calibration potentiometer R17 is included in this half bridge. If the setpoint knob is placed in a fixed, known orientation (of, in the preferred case the location where 70 degrees F. temperature is indicated when the user observable knob is installed), this calibration potentiometer can adjust for printed circuit board mounting misalignment of the setpoint potentiometer and it can also absorb some of the component tolerance differences and their effects. Up to ±15 degrees mechanical misalignment of the setpoint potentiometer R14 can be calibrated out (adjusted for) with acceptable setpoint errors over the accuracy range of 59–77 deg. F., and the operational range of 41–95 deg. F., with setpoint errors of ±0.6 deg. F. and 1.6 deg. F., respectively.

Lastly, the jumpers J1 and J2 are included to aid in the calibration process also in this embodiment. The jumpers may be removed during calibration and put back in place when the calibration is completed. These jumpers can be implemented if desired as a circuit board trace feature, as is well known to those of ordinary skill in the art.

The temperature sensing half of the bridge in the preferred embodiment assumes that the thermistor R27 resistance varies between 350 k ohms at 30 deg. F. to 60 k ohms at 100 deg. F. This changing resistance results in a change in bridge voltage that represents measured temperature. The voltage from this temperature sensing bridge half is non-linear with respect to the changing resistance of R27. Conveniently, the relationship between temperature and resistance on R27 is non-linear in the same way, such that a linear change in temperature will result in a linear change in gain. The value of resistor R13 is carefully selected to align these two non-linearities in such a way that the full range of sensed temperatures fully exploits the voltage range available from this bridge half R13 is selected such that this bridge half gain is 0.5 at the midpoint of the sensed temperature range. If R27 is approximately 120 K ohms at 68 degrees F., the R13 is selected to be 120 K ohms and bridge half gain is 0.5 at 68 degrees F. sensed temperature.

Because of this, the setpoint voltage and temperature sensed voltage can be directly compared over the operational and accuracy temperature ranges with acceptable setpoint error. In the preferred embodiment between 32 and 95 deg. F., the setpoint error is −1 deg. F. to +3 deg. F., and from 59 to 77 deg. F. the setpoint error is 0.1 to 0.5 deg. F.

The voltages from both halves of the above described bridge must be low pass filtered. In the preferred embodiment, this is accomplished through a series of two filters. The first filters the temperature sensing bridge half relative to the circuit ground reference, and the second filters the setpoint bridge half relative to the filtered output of the temperature sensing bridge half. Components capacitor C7 and resistor R10 form the first filter and provide a corner frequency on the temperature sensing bridge half ranging from 0.406 Hz to 0.815 Hz (with a time constant of 0.195 to 0.392 seconds). The range of corner frequencies is due to the changing resistance of the thermistor R27. This low pass filter slows down the response of the bridge half to changes in the values of R27 that results from a short lived temperature swing in the surrounding air. The second filter is formed by capacitor C6 and the setpoint bridge half resistors R14–17, and R36. The second filter filters the output voltage of the setpoint bridge half relative to the isolated output voltage of the temperature sensing bridge half. (As will be described, this is isolated via op amp U2.)

This second filter provides a corner frequency of roughly 0.306 Hz with a time constant of 0.520 seconds and is very important to provide stable voltage differences at the final compare stage of the control circuit. This second filter prevents the potential for device stress due to excessive on/off rates which may be caused by unthinking rapid movements of the setpoint knob about the actual sensed temperature switching point and also acts to eliminate various electrical noise generating unwanted control actions.

Because this filter is of a differential nature, negative voltages could temporarily appear at the point where capacitor C6 connects to resistor R14. To prevent harm from occurring to operational amplifier U4, diode D13 and resistor R32 are used to clamp negative going voltages at less than −0.3 Volts DC in the preferred embodiment, an acceptable level for this operational amplifier.

The filtered bridge voltages just described are compared at input lines 9 and 10 of op amp U4. Proper isolation of the bridge circuit from comparison circuitry is implemented by the voltage follower op amp U2 on one of the input voltage lines, and by connecting the other input voltage line to the high impedance negative terminal of the comparing operational amplifier U4 (line 9). Hysterisis (positive feedback) is implemented or caused by the use of components resistors R7, R9 and C3. This establishes the temperature sensing dead band(that range of temperature change over which the thermostat reaction to a change in setpoint is undesirable) and the cycle rate results from that dead band. This also provides a clean on/off comparison output for driving the ganged relay/triac (K1, Q2). In the preferred embodiment, hysterisis is approximately 1 deg. F. The output of U4 is considered high when the sensed temperature is lower than the setpoint temperature, otherwise its output is low.

To drive the K1 relay coil, this high or low output (pin 8 of the op amp U4) provides a base drive through transistor Q5 via the limiting resistors R26 and R34. Transistor Q5 provides on/off control to the drive current to the K1 relay coil. Thus, when Q5 is turned on, the K1 relay coil is energized, causing its normally (no) contact to close, and the normally closed (nc) contact to open. When Q5 is turned off, a K1 relay coil is de-energized, causing the "no" contact to open and the "nc" contact to close. In the preferred embodiment, a flyback diode D9 prevents voltage transients when the relay coil is turned off.

The temperature sensing and control function block heuristically described in FIG. 5 also drives the Q2 triac gate pulse. The triac Q2 is pulsed on during the contact transitions of the K1 relay. The controlled pulse is generating by using an RC charge and discharge characteristic to influence a biased hysterisis compare operation in the preferred embodiment.

The output from op amp U4 (line 8) drives the RC combination of resistor R21 and capacitor C8. The charge and discharge characteristics of this RC combination influence the bias inputs of op amp U3 through diodes D10 and D11. Once capacitor C8 is fully charged or fully discharged, its actions with resistor R21 no longer influence the biased inputs of U3. The bias provided by resistors R20, 22, 23 and 25 is adjusted so as to guarantee a comparison output at op amp U3, line 14 of zero volts when capacitor C8 and resistor R21 are in a DC steady state condition. That is a negative compare input of op amp U3 is at a greater positive voltage than the positive compare input. When capacitor C8 is charging the positive compare of op amp U3, line input 12, is temporarily elevated in voltage causing a temporary positive voltage output of op amp U3 (line 14). When capacitor C8 is discharging a negative compare input of op amp U3 (line 13) is temporarily dropped in voltage causing a temporary positive voltage output at op amp U3, line 14. Resistor R8 provides positive feedback establishing a clean on/off operation of the compare output. The pulse duration for the Q2 gate drive (G) must encompass the worst case (longest possible) transition time of the K1 relay contacts. In the preferred embodiment the pulse duration must be greater than 15 milliseconds. The duration of the pulse depends on the level of the regulated power supply voltage and on the tolerance match of the components. The preferred embodiments pulse durations over operation and power extremes have varied from 16 msec to 23 msec when the relay is energized and from 31 msec to 48 msec when the relay is deenergized.

The pulse output from op amp U3 controls the on state of the current source derived from components transistor Q4 and resistor R19. When the current sources is pulsed on, a current is drawn out of the triac Q2 gate terminal G, turning this triac on. This direct drive of the triac Q2 gate is possible because the regulated DC voltage is referenced back to the line voltage at the point where the MT1 terminal of the triac makes contact. The value of resistor R19 in the preferred embodiment was carefully selected to provide the most drive current possible without over taxing the charge reserve of capacitor C2 and the minimum $V_{C2}$ condition. By pulling current out of the gate terminal, the triac is forced to operate in its II and III quadrants, (i.e. always operating with negative gate current). Resistor R18 and capacitor C9 are placed between the triac gate and MT1 terminal to reduce the triac's sensitivity to false turn on.

The thermal cut out (TCO1) is needed to protect against extreme heating and possible combustion due to triac failures to provide safety to the typical user of the thermostat. As is well known high voltage triacs will fail short circuited, potentially conducting large currents continuously and heating up to extreme temperature. The preferred embodiment TC0 (TCO1) has 100° Centigrade cut out temperature which is high enough to not be affected by normal operation or shipping and yet low enough to protect against over heating and possible combustion. This TCO must be thermally coupled to the case of the triac Q2.

Power Switch Block

The power switch is a form 1c (SPDT) relay (K1) ganged with a triac (Q2) in a way that exploits the strengths of each device. The triac is connected across the contacts of the relay and is activated during relay contact transitions. This configuration takes advantage of the triacs' fast turn-on and large inrush current capabilities to handle the extreme line conditions experienced when turning line voltage on and off to the load. It also takes advantage of the low contact resistance and low power dissipation afforded by the relay during the steady state on condition.

Because the triac snubs the relay contacts at make/break transitions, and the continuous current capability of the relay is much greater than its rated turn-on and turn-off current, the relay utilized in the circuit can be rated lower than the expected application currents. The K1 relay (an Aromat JS1E-12 V in the preferred embodiment) is rated at 10 A for 120 Vac and at 6 A for 277 Vac, yet is expected to handle currents as high as 17.6 A for 264 Vac.

The triac is not operated continuously. Rather, it is pulsed on for a very short time. Thus, the device does not heat significantly and no heat sink mechanisms or structures are required. Because the triac is not expected to operate continuously, but to only provide snubbing action, it would be expected that a derated triac part could also be used; however, it has been discovered that this is not entirely the case. Due to the construction of the device, the triac rated current must be close to the highest current it is expected to conduct. This guarantees device junction areas and current densities that can reliably handle the switching conditions (i.e., large instantaneous powers and internal capacitive turn-off discharge) presented at the higher load currents. The triac device must also be non-sensitive-gate ($\geq 25$ mA gate current required for turn on) in order to have adequate junction resistances and capacitances for proper triac turn off at the higher load currents. Finally, the triac voltage must be large enough (>600 V) to safeguard against voltage breakover due to line transients and the limitations of the MOV protection. A Q2 triac rating of 15 to 16 A, with an 800 V breakover voltage, can be expected to handle the maximum 17.6 A load current and operate within the constraints of the MOV (VR1). The Q2 triac selected in the preferred embodiment is Motorola MAC15-10; 15 A, 800 V rating with a 50 mA gate current required. The snubbing action of the triac will extend the life of the relay.

For highly inductive loads, resistor R31 and capacitor C4 provide additional snubbing of the triac terminals to prevent false turn-on. Another option for inductive loads is to replace the triac (Q2) with an alternistor (a triac specially designed for inductive loads. Teccor Semiconductors of Irving, Tex., makes alternistors which can be used.)

Mode and Fan Speed Switches

An important part of this are the mode and fan speed switches.—The Mode switch SW1 provides the mode control i.e., either cool or heating, or an off condition. The fan speed switch SW2 controls fan speed in a continuous or noncontinuous (cycling) fashion.

The position of this slide switch SW1 determines which contact of the relay K1 is used to energize the load, thereby determining whether the sensed temperatures above or below the set point temperature will cause the load to be activated. An important feature in the preferred embodiment is that the connection of the triac is accomplished such that the relay contact protection is provided in both heating and cooling modes. Thus, once the user selects the mode, the thermostat calls for heat or cold based on this selection. (For ease of reading the switches SW1 and SW2 note that the tow bars connect two adjacent posts and move up or down together, along the dotted centerline of the switches.) Switch SW2 provides fan speed control by connecting the appropriate fan wire into the controlled switching path. Jumpers J3 and J4 are provided to configure the fan for either continuous or cycling operation.

In the preferred embodiment the user can set the Fan Speed switch SW2 to off, in which case when jumper J4 is connected and jumper J3 is not connected, the fan will only turn on in response to a call by the thermostat to change the valve (primary action) to open, and then only in low speed. Otherwise with jumper J4 in place and J3 removed, there is continuous fan (secondary actuator) operation in whatever speed setting the user sets it to. When jumper J4 is not in place and Jumper J3 is in place, operation is noncontinuous or cycling. In this mode, the fan will only turn on when heat or cooling is called for, and it will turn on at the level set by the user (low, medium or high in this preferred embodiment). With jumper J4 removed and J3 in place, the off and low position of switch 2 has the same effect—cycling operation at low speed.

The system is outlined heuristically in FIG. 5 as system Thermostat 80. Two power lines L1 and L2 provide power to the power supply 81, L1 being also connected to the two loads (the fan and the hydronic valve in the preferred embodiment) and L2 also providing input to the power switch 84. The Power supply provides power to the power up protection circuitry 82 and the temperature sense and control circuitry 83 as well as the power switch 84, on two separate lines 87a and 87b. The other sides of the loads of the Fan and the valve are connected to the Mode and fan speed switches (SW's 1 and 2 in the FIG. 4A illustration). The power switch 84 is connected to close the circuit between those switches and L2. Thus, in operation, the Power up protection 82 protects the temperature sensing and control circuitry 83, which in turn controls the power switching circuitry in box 84. The Box 84 circuits allow power to flow through the loads, controlled by the switches in box 85 that control the speed of the fan, continuous or noncontinuous operation and the mode control. Lines L1 and L2 provide line level voltage, which in a residential house is about 110 V, in the United States. Different voltage values would of course require different component values than those discussed and this patent is not felt to be limited to any particular set of component values or configurations other than as is set forth in the following appended claims.

What is claimed is:

1. A thermostat for receiving two input voltage lines, one of which drives two actuator loads and the other of which is supplied directly to a power switching circuit of the thermostat and wherein both said input voltage lines are connected into a power supply circuit in said thermostat, said thermostat also having;

said power supply circuit providing positive voltage and return to a power up protection circuit, a temperature sensing and control circuit, and said power switching circuit, said power up protection circuit connected to inhibit said temperature sensing and control circuit when power input is not adequate for relay pull-in, and said temperature sensing and control circuit acting to control said power switching circuit, and having two user-accessable switches to control the mode of operation, selecting either to allow the temperature sensing and control circuit to respond to heat or to cool differences from a temperature setpoint and to control the speed of a variable speed load.

* * * * *